United States Patent
Chen et al.

(10) Patent No.: US 12,222,754 B2
(45) Date of Patent: Feb. 11, 2025

(54) PORTABLE ELECTRONIC DEVICE INCLUDING POSITIONING HOOK, DETACHABLLY DISPOSED PATTERNED LIGHT GUIDE FILM, AND DETACHABLY DISPOSED LIGHT-TRANSMITTING PLATE

(71) Applicant: Acer Incorporated, New Taipei (TW)

(72) Inventors: Hung-Chi Chen, New Taipei (TW); Hsueh-Wei Chung, New Taipei (TW); Pao-Ching Huang, New Taipei (TW); Huei-Ting Chuang, New Taipei (TW); Chao-Di Shen, New Taipei (TW)

(73) Assignee: Acer Incorporated, New Taipei (TW)

(*) Notice: Subject to any disclaimer, the term of this patent is extended or adjusted under 35 U.S.C. 154(b) by 0 days.

(21) Appl. No.: 18/513,635

(22) Filed: Nov. 20, 2023

(65) Prior Publication Data
US 2024/0345622 A1 Oct. 17, 2024

(30) Foreign Application Priority Data
Apr. 11, 2023 (TW) .................. 112113515

(51) Int. Cl.
| G06F 1/16 | (2006.01) |
| F21V 8/00 | (2006.01) |
| G02F 1/1333 | (2006.01) |
| G02F 1/13357 | (2006.01) |
| G06F 3/02 | (2006.01) |

(52) U.S. Cl.
CPC ......... *G06F 1/1616* (2013.01); *G02B 6/0035* (2013.01); *G02B 6/005* (2013.01); *G02B 6/0088* (2013.01); *G02B 6/0091* (2013.01); *G02F 1/133331* (2021.01); *G02F 1/133606* (2013.01); *G06F 1/1637* (2013.01); *G06F 3/0202* (2013.01)

(58) Field of Classification Search
CPC . G02F 1/133331; G06F 1/1616; G06F 3/0202
See application file for complete search history.

(56) References Cited

U.S. PATENT DOCUMENTS

| 2002/0080298 A1* | 6/2002 | Fukayama | .......... G02F 1/13452 |
| | | | 349/58 |
| 2019/0272005 A1* | 9/2019 | Wickett | ................ G06F 1/1607 |

FOREIGN PATENT DOCUMENTS

| CN | 1940681 | 4/2007 |
| CN | 110133792 | 8/2019 |
| TW | 594116 | 6/2004 |

(Continued)

Primary Examiner — Keith G. Delahoussaye
(74) Attorney, Agent, or Firm — JCIPRNET (57) ABSTRACT

A portable electronic device including a first body, a second body, and a light module is provided. The second body is pivotally connected to the first body. The light module is adjacent to the second body and is disposed on the first body. The light module includes a frame, a light guide plate, a light source, a patterned light guide film, and a light-transmitting cover plate. The frame is disposed on the first body. The light guide plate is disposed in the frame and has a light incident surface and a light emitting surface. The light source is disposed in the frame as corresponding to the light incident surface of the light guide plate. The patterned light guide film is detachably disposed on the light guide plate and covers the light emitting surface. The light-transmitting cover plate is detachably disposed on the frame and covers the patterned light guide film.

9 Claims, 7 Drawing Sheets

(56) References Cited

FOREIGN PATENT DOCUMENTS

| TW | 201025672 | 7/2010 |
| TW | M582736 | 8/2019 |
| TW | 202136956 | 10/2021 |

* cited by examiner

PORTABLE ELECTRONIC DEVICE INCLUDING POSITIONING HOOK, DETACHABLLY DISPOSED PATTERNED LIGHT GUIDE FILM, AND DETACHABLY DISPOSED LIGHT-TRANSMITTING PLATE

CROSS-REFERENCE TO RELATED APPLICATION

This application claims the priority benefit of Taiwan application serial no. 112113515, filed on Apr. 11, 2023. The entirety of the above-mentioned patent application is hereby incorporated by reference herein and made a part of this specification.

BACKGROUND

Technical Field

The disclosure relates to a portable electronic device, and particularly relates to a portable electronic device having a lighting effect.

Description of Related Art

Since a notebook computer may provide a high computing performance and is easy to carry around, it has become an indispensable tool in the life or work of modern people. With the development of technology, a user not only have a minimum requirement for the hardware specification of the notebook computer, but also expect to obtain a good operating experience in the process of operating the notebook computer, such as a sound effect, the lighting effect, the operating feel of the keyboard, or other sensory experiences. Therefore, satisfying different operation requirements while providing the good operating experience is an extremely important issue in product planning and development.

SUMMARY

The disclosure provides a portable electronic device, which has excellent operating flexibility and a good operating experience.

A portable electronic device according to an embodiment of the disclosure includes a first body, a second body, and a light module. The second body is pivotally connected to the first body. The light module is adjacent to the second body and is disposed on the first body. The light module includes a frame, a light guide plate, a light source, a patterned light guide film, and a light-transmitting cover plate. The frame is disposed on the first body. The light guide plate is disposed in the frame and has a light incident surface and a light emitting surface. The light source is disposed in the frame as corresponding to the light incident surface of the light guide plate. The patterned light guide film is detachably disposed on the light guide plate and covers the light emitting surface of the light guide plate. The light-transmitting cover plate is detachably disposed on the frame and covers the patterned light guide film.

A portable electronic device according to another embodiment of the disclosure includes a first body, a second body, and a light module. The second body is pivotally connected to the first body. The light module is adjacent to the second body and is disposed on the first body. The light module includes a frame, a light guide plate, a light source, and a light-transmitting cover plate. The frame is disposed on the first body. The light guide plate is detachably disposed in the frame and has a light incident surface and a patterned light emitting surface. The light source is disposed in the frame as corresponding to the light incident surface of the light guide plate. The light-transmitting cover plate is detachably disposed on the frame and covers the patterned light emitting surface.

Based on the above, a user can detach and replace the patterned light guide film or the light guide plate having the patterned light emitting surface according to operation requirements, so as to obtain different lighting effects. Therefore, the portable electronic device of the disclosure can not only provide a good operating experience, but also has excellent operating flexibility to satisfy operation requirements of different users or different operation requirements of the same user.

In order to make the above-mentioned features and advantages of the disclosure more comprehensible, the following embodiments are described in detail together with the accompanying drawings.

DESCRIPTION OF THE EMBODIMENTS

Figure 1:
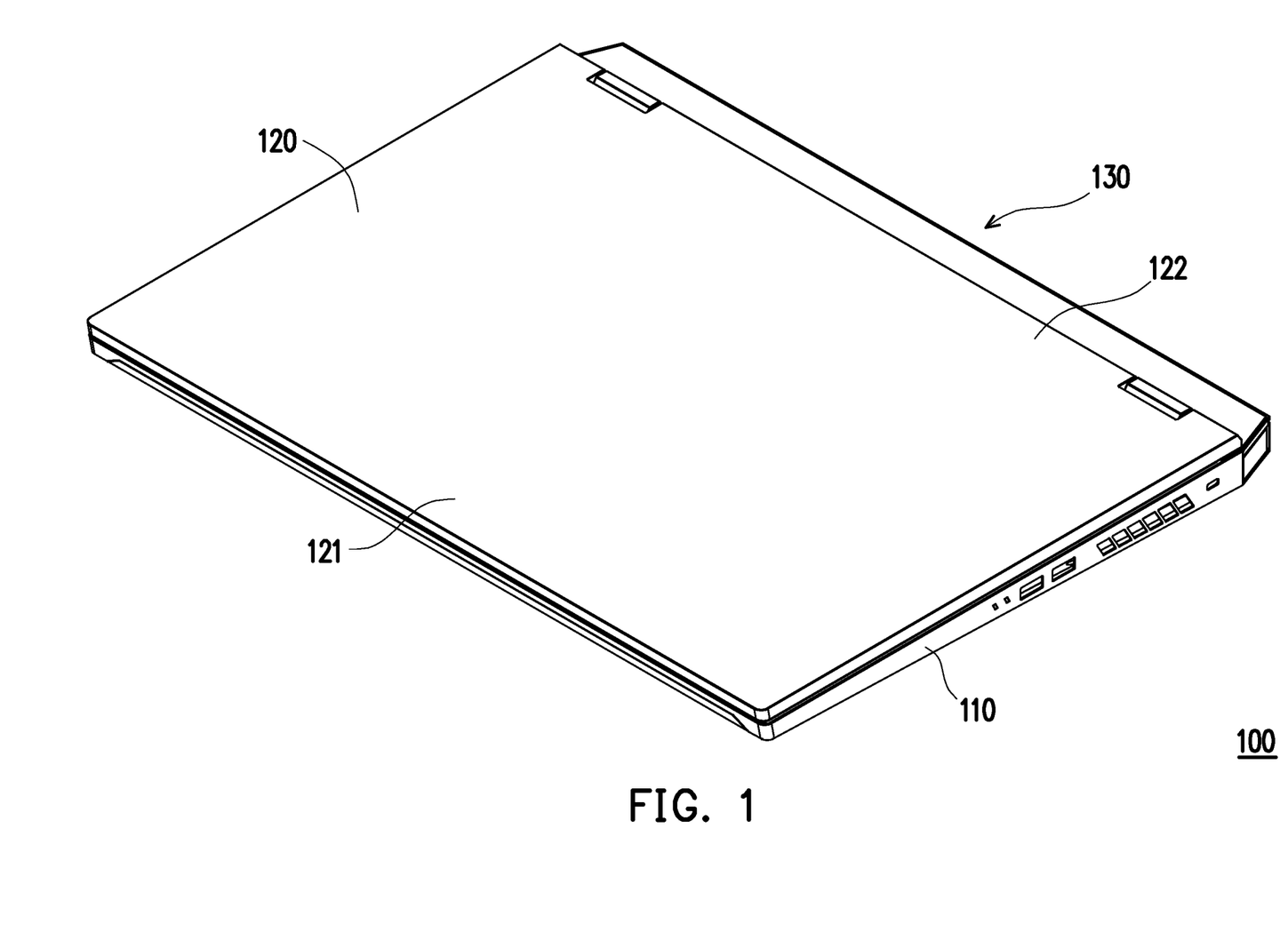
FIG. 1 is a schematic view of a portable electronic device according to an embodiment of the disclosure.

FIG. 1 is a schematic view of a portable electronic device according to an embodiment of the disclosure. Please refer to FIG. 1, in this embodiment, a portable electronic device 100 may be a notebook computer, and includes a first body 110, a second body 120, and a light module 130. The first body 110 may be a host, for example, provided with a central processing unit, a graphics processing unit, and a memory. The second body 120 may be a display used to display image information. The second body 120 is pivotally connected to the first body 110 to rotate relative to the first body 110 and transform between an unfolded state and a closed state.

The light module 130 is adjacent to the second body 120 and is disposed on the first body 110. The light module 130 may be used to provide different lighting effects to satisfy a sensory experience of a user. Specifically, the second body 120 has a movable end 121 and a pivot end 122 opposite to each other, in which the pivot end 122 is pivotally connected to the first body 110, and the light module 130 is adjacent to the pivot end 122. On the other hand, the movable end 121 is used as a force applying end, and the user may apply a force to the movable end 121 to drive the pivot end 122 to rotate relative to the first body 110.

Figure 2A:
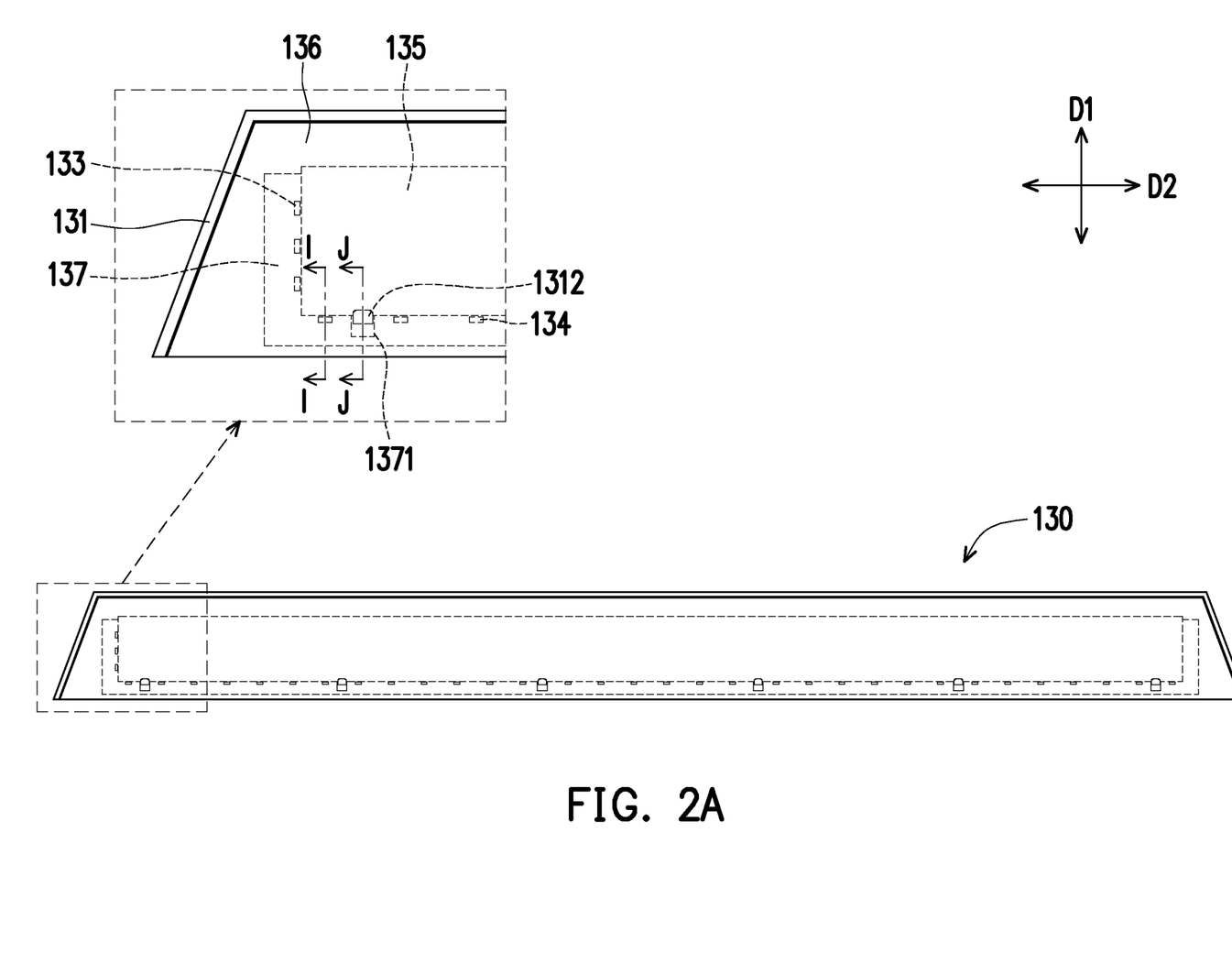
FIG. 2A is a schematic top view of a light module according to an embodiment of the disclosure.
Figure 2B:
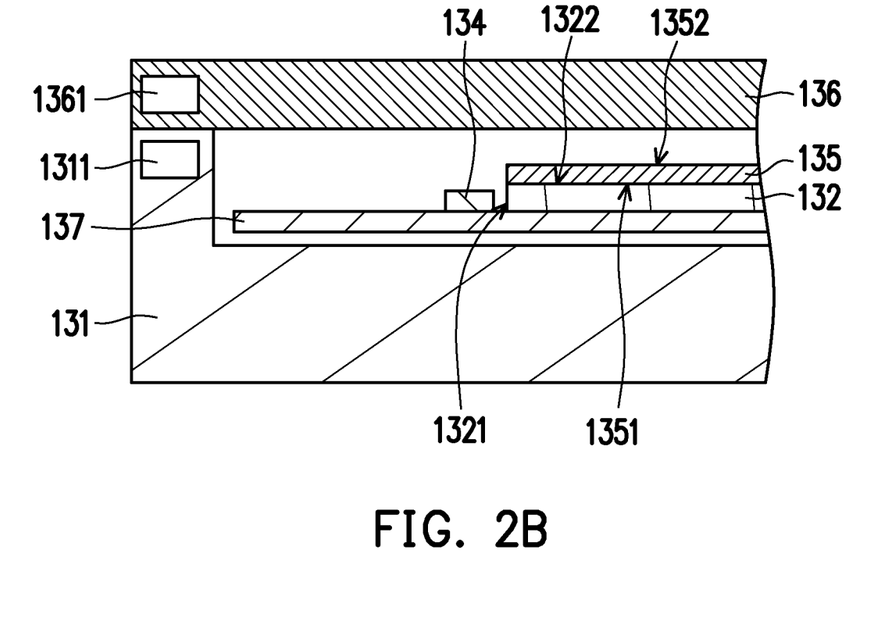
FIG. 2B is a schematic cross-sectional view of the light module in FIG. 2A along a line I-I.
Figure 2C:
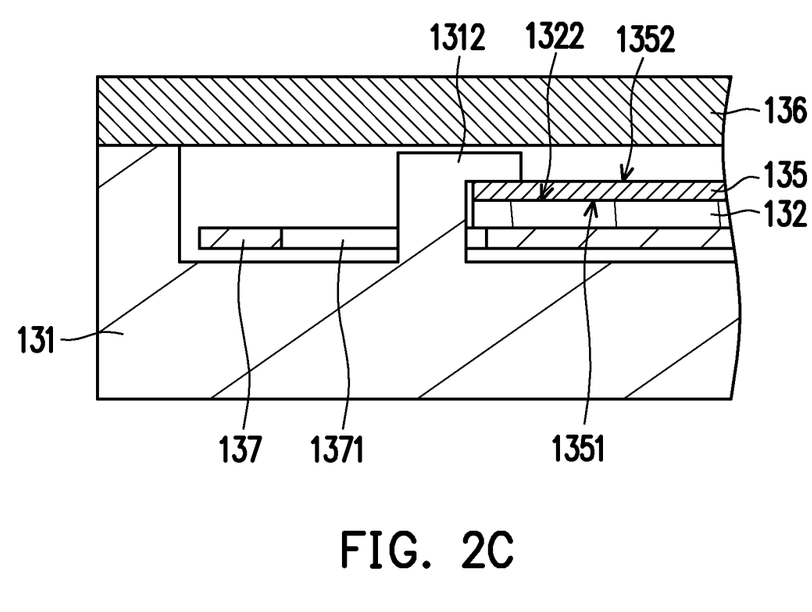
FIG. 2C is a schematic cross-sectional view of the light module in FIG. 2A along a line J-J.

FIG. 2A is a schematic top view of a light module according to an embodiment of the disclosure. FIG. 2B is a schematic cross-sectional view of the light module in FIG. 2A along a line I-I. FIG. 2C is a schematic cross-sectional view of the light module in FIG. 2A along a line J-J. Please refer to FIG. 2A and FIG. 2B, in this embodiment, the light module 130 includes a frame 131, a light guide plate 132, a light source, a patterned light guide film 135, and a light-transmitting cover plate 136. The frame 131 is disposed on the first body 110 and is used to accommodate or carry the light guide plate 132, the light source, the patterned light guide film 135, and the light-transmitting cover plate 136.

Further, the light guide plate 132 is disposed in the frame 131 and has a light incident surface 1321 and a light emitting surface 1322. The light source is disposed in the frame 131 as corresponding to the light incident surface 1321 of the light guide plate 132, the light source may include multiple first light emitting components 133 and multiple second light emitting components 134, and may be multiple light emitting diodes distributed around the light guide plate 132.

Please refer to FIG. 2B. The patterned light guide film 135 is disposed on the light guide plate 132 and covers the light emitting surface 1322 of the light guide plate 132. In detail, the patterned light guide film 135 has a lower surface 1351 facing the light emitting surface 1322 and an upper surface 1352 opposite to the lower surface 1351, and the lower surface 1351 contacts the light emitting surface 1322. For example, the patterned light guide film 135 may be a light-transmitting film, and the upper surface 1352 is roughened, formed with an opaque ink pattern, formed with a light-transmitting ink pattern, other designs that change a light transmission path, or other designs that change a lighting effect. The light-transmitting cover plate 136 is disposed on the frame 131 and covers the patterned light guide film 135.

Therefore, a light emitted by the light source first enters the light guide plate 132 from the light incident surface 1321, and then exits from the light emitting surface 1322. Next, the light enters from the lower surface 1351 into the patterned light guide film 135 and then exits from the upper surface 1352. Finally, the light passes through the light-transmitting cover plate 136 and emits to the outside. The patterned light guide film 135 may be used to change the light transmission path or the lighting effect to generate different visual experiences.

Please refer to FIG. 2B and FIG. 2C, in this embodiment, the light-transmitting cover plate 136 may be detached from the frame 131, and the patterned light guide film 135 may be detached from the light guide plate 132. Therefore, the user can detach and replace the patterned light guide film 135 according to operation requirements, so as to obtain different lighting effects. That is to say, the portable electronic device 100 can not only provide a good operating experience, but also has excellent operating flexibility to satisfy operation requirements of different users or different operation requirements of the same user.

As shown in FIG. 2B, the light-transmitting cover plate 136 has a first magnetic part 1361, and the frame 131 has a second magnetic part 1311. The first magnetic part 1361 is magnetically attracted to the second magnetic part 1311 to position the light-transmitting cover plate 136 on the frame 131. In an example, the first magnetic part 1361 and the second magnetic part 1311 may be a combination of two magnets. In another example, the first magnetic part 1361 and the second magnetic part 1311 may be a combination of a magnet and a magnetic conductive member, and the magnetic conductive member may be made of iron, cobalt, nickel, manganese or alloys thereof.

As shown in FIG. 2A and FIG. 2C, the light module 130 further includes a circuit board 137. The circuit board 137 is disposed in the frame 131, in which the multiple first light emitting components 133, the multiple second light emitting components 134, and the light guide plate 132 are disposed on the circuit board 137, and the multiple first light emitting components 133 and the multiple second light emitting components 134 are electrically connected to the circuit board 137. In detail, the multiple first light emitting components 133 are arranged on the circuit board 137 along a first direction D1, and the multiple second light emitting components 134 are arranged on the circuit board 137 along a second direction D2 perpendicular to the first direction D1.

As shown in FIG. 2C, the frame 131 has a positioning hook 1312 positioned around the light guide plate 132, and the circuit board 137 has a positioning hole 1371 positioned around the light guide plate 132. The positioning hook 1312 engages with the positioning hole 1371 to position the circuit board 137 on the frame 131. Further, the positioning hook 1312 passes through the positioning hole 1371 and contacts (or presses against) the upper surface 1352 of the patterned light guide film 135 to position the patterned light guide film 135 and the light guide plate 132 on the circuit board 137.

Figure 3:
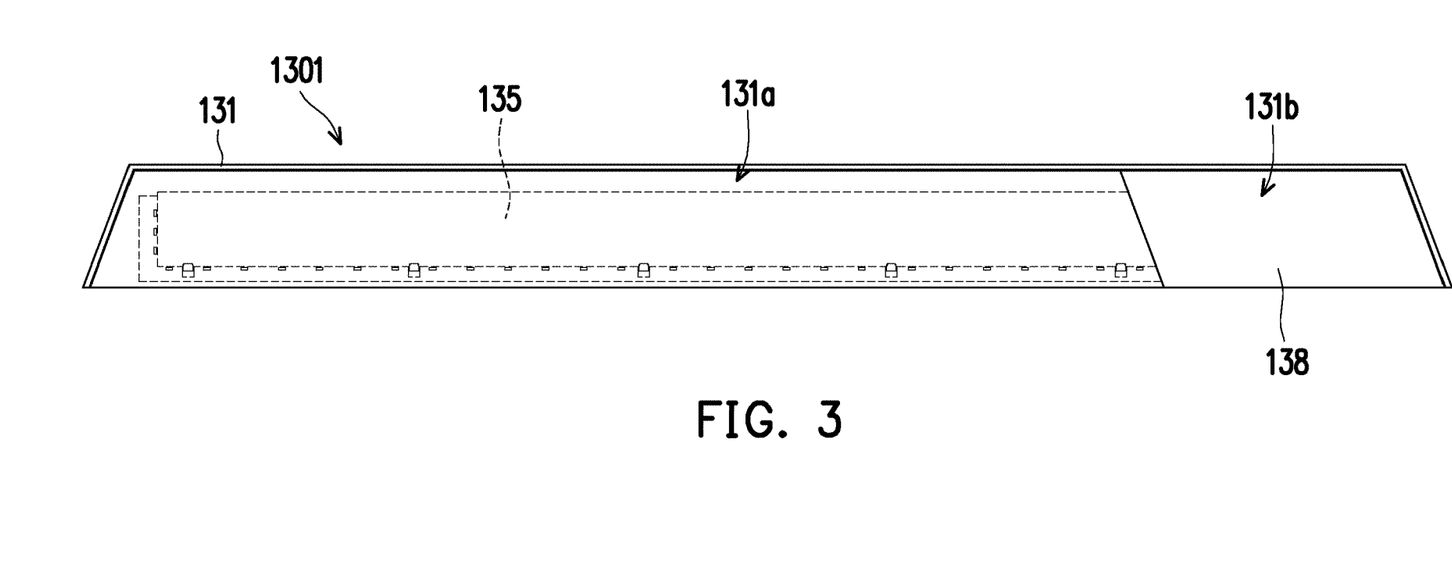
FIG. 3 is a schematic top view of a light module according to another embodiment of the disclosure.

FIG. 3 is a schematic top view of a light module according to another embodiment of the disclosure. Please refer to FIG. 3. The structural design of a light module 1301 of this embodiment and the light module 130 of the previous embodiment may be applied to the portable electronic device 100 (refer to FIG. 1). Compared with the light module 130 of the previous embodiment, the light module 1301 of this embodiment further includes an auxiliary display 138 used to display images or text information. Further, the frame 131 may be divided into a lighting area 131a and a display area 131b adjacent to the lighting area 131a, and the lighting area 131a may be defined by a range where the patterned light guide film 135 is positioned. On the other hand, the auxiliary display 138 is disposed in the display area 131b to provide the information required by the user, which helps improve the convenience of operation.

Figure 4A:
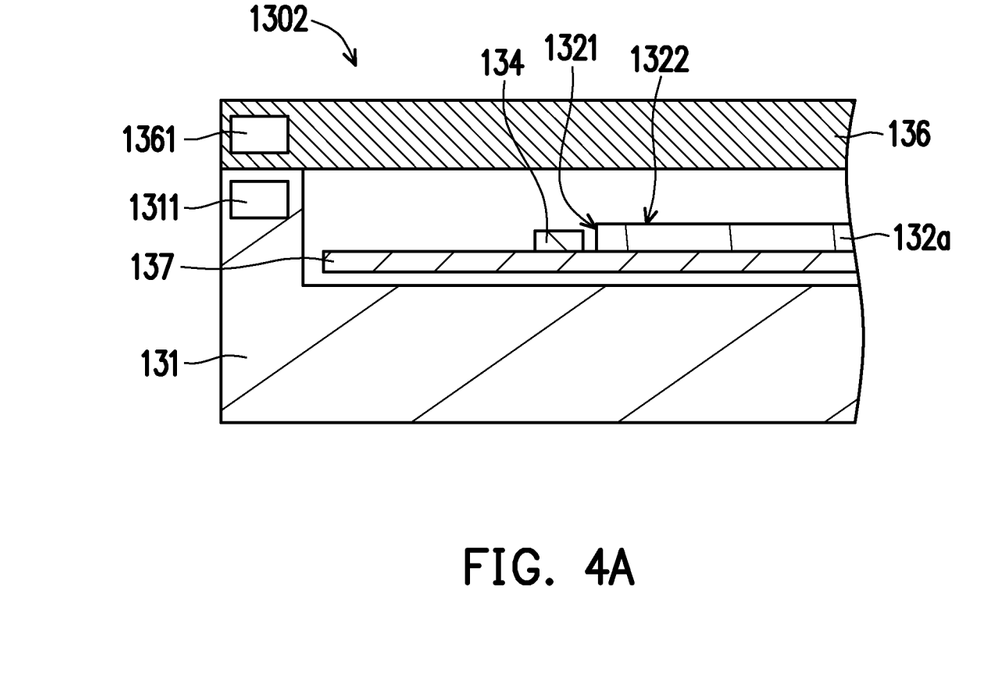
FIG. 4A and FIG. 4B are schematic cross-sectional views of a light module along two different lines according to another embodiment of the disclosure.
Figure 4B:
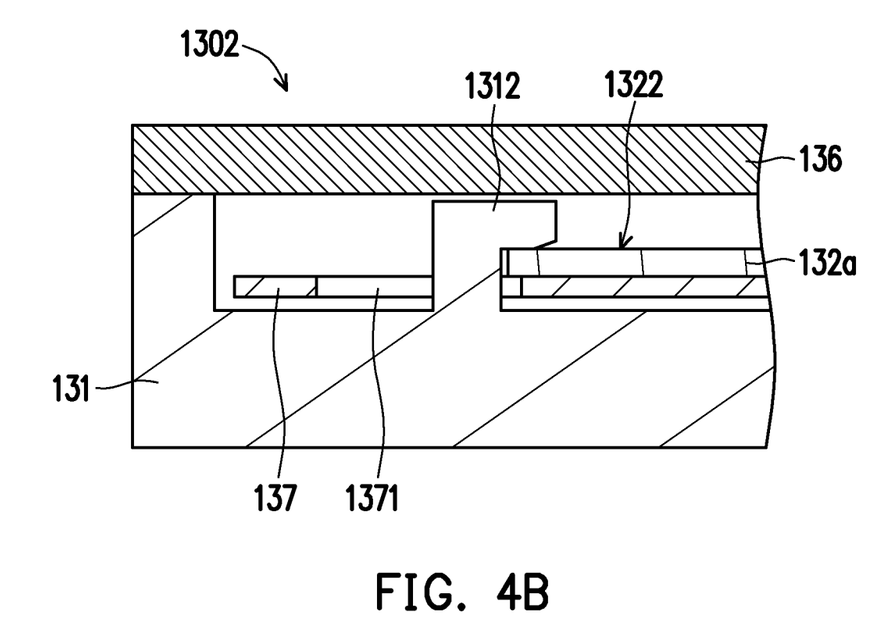

FIG. 4A and FIG. 4B are schematic cross-sectional views of a light module along two different lines according to another embodiment of the disclosure. Please refer to FIG. 4A and FIG. 4B. The structural design of a light module 1302 of this embodiment and the light module 130 of the previous embodiment may be applied to the portable electronic device 100 (see FIG. 1). Compared with the light module 130 of the previous embodiment, the light emitting surface 1322 of a light guide plate 132a of the light module 1302 of this embodiment is not covered by the patterned light guide film 135 (see FIG. 2B and FIG. 2C).

Further, the light emitting surface 1322 of the light guide plate 132a may be a patterned light emitting surface, such as roughened, formed with the opaque ink pattern, formed with the light-transmitting ink pattern, other designs that change the light transmission path, or other designs that change the lighting effect. The light-transmitting cover plate 136 is disposed on the frame 131 and covers the patterned light emitting surface of the light guide plate 132a. Therefore, the light emitted by the light source first enters the light guide plate 132a from the light incident surface 1321, and then exits from the light emitting surface 1322. Finally, the light passes through the light-transmitting cover plate 136 and emits to the outside. The patterned light emitting surface of the light guide plate 132a may be used to change the light transmission path or the lighting effect to generate different visual experiences.

On the other hand, the light-transmitting cover plate 136 may be detached from the frame 131, and the light guide plate 132a may be detached from the frame 131. Therefore, the user may detach and replace the light guide plate 132a according to the operation requirements, so as to obtain different lighting effects. As shown in FIG. 4B, the positioning hook 1312 passes through the positioning hole 1371 and contacts (or presses against) the light emitting surface 1322 of the light guide plate 132a to position the light guide plate 132a on the circuit board 137.

In other examples, the light module 1302 may be integrated with the auxiliary display 138 (see FIG. 3), the lighting area 131a (see FIG. 3) may be defined by an area where the light guide plate 132a is positioned, and the auxiliary display 138 (see FIG. 3) is disposed in the display area 131b (see FIG. 3).

In summary, the user can detach and replace the patterned light guide film or the light guide plate having the patterned light emitting surface according to the operation requirements, so as to obtain different lighting effects. Therefore, the portable electronic device of the disclosure can not only provide a good operating experience, but also has excellent operating flexibility to satisfy the operation requirements of different users or the different operation requirements of the same user.

Although the disclosure has been disclosed as above with the embodiments, the embodiments are not intended to limit the disclosure. Persons with ordinary knowledge in the technical field may make some changes and modifications without departing from the spirit and scope of the disclosure. The scope of protection of the disclosure should be defined by the appended claims.

What is claimed is:

1. A portable electronic device, comprising:
   a first body;
   a second body pivotally connected to the first body; and
   a light module adjacent to the second body and disposed on the first body, wherein the light module comprises:
     a frame disposed on the first body;
     a light guide plate detachably disposed in the frame and having a light incident surface and a patterned light emitting surface;
     a light source disposed in the frame as corresponding to the light incident surface of the light guide plate; and
     a light-transmitting cover plate detachably disposed on the frame and covering the patterned light emitting surface.

2. A portable electronic device, comprising:
   a first body;
   a second body pivotally connected to the first body; and
   a light module adjacent to the second body and disposed on the first body, wherein the light module comprises:
   a frame disposed on the first body;
   a light guide plate disposed in the frame and having a light incident surface and a light emitting surface;
   a light source disposed in the frame as corresponding to the light incident surface of the light guide plate;
   a patterned light guide film detachably disposed on the light guide plate and covering the light emitting surface of the light guide plate; and
   a light-transmitting cover plate detachably disposed on the frame and covering the patterned light guide film, wherein the light-transmitting cover plate has a first magnetic part, the frame has a second magnetic part, and the first magnetic part is magnetically attracted to the second magnetic part.

3. The portable electronic device according to claim 2, wherein the second body has a movable end and a pivot end opposite to each other, the pivot end is pivotally connected to the first body, and the light module is adjacent to the pivot end.

4. The portable electronic device according to claim 2, wherein the first magnetic part and the second magnetic part are a combination of two magnets or a combination of a magnet and a magnetic conductive member.

5. The portable electronic device according to claim 2, wherein the light module further comprises:
   a circuit board disposed in the frame, wherein the light source and the light guide plate are disposed on the circuit board, and the light source is electrically connected to the circuit board.

6. The portable electronic device according to claim 5, wherein the light source comprises a plurality of light emitting components, a part of the plurality of light emitting components are arranged on the circuit board along a first direction, and a part of the light emitting components are arranged on the circuit board along a second direction perpendicular to the first direction.

7. The portable electronic device according to claim 5, wherein the frame has a positioning hook positioned around the light guide plate, the circuit board has a positioning hole positioned around the light guide plate, and the positioning hook engages with the positioning hole.

8. The portable electronic device according to claim 5, wherein the frame has a positioning hook positioned around the light guide plate, the circuit board has a positioning hole positioned around the light guide plate, the patterned light guide film has a lower surface facing the light emitting surface of the light guide plate and an upper surface opposite to the lower surface, and the positioning hook passes through the positioning hole and contacts the upper surface of the patterned light guide film.

9. The portable electronic device according to claim 2, wherein the frame is divided into a lighting area and a display area adjacent to the lighting area, the lighting area is defined by a range where the patterned light guide film is positioned, the light module further comprises an auxiliary display, and the auxiliary display is disposed in the display area of the frame.

\* \* \* \* \*